United States Patent [19]
Kats et al.

[11] 4,023,594
[45] May 17, 1977

[54] THROTTLE

[76] Inventors: Arnold Yakovlevich Kats, ulitsa Korolenko, 17, kv. 22; Georgy Pavlovich Dubosarsky, Chernomorskaya doroga, 19, kv. 5; Dmitry Pavlovich Zakhvatkin, ulitsa Kosmonavtov, 20, kv. 57; Iosif Kharitonovich Burda, ulitsa Tereshkovoi, 20v, kv. 28; Sergei Afanasievich Mezentsev, Primorsky bulvar, 2, kv. 4; Natan Mironovich Barshtak, ulitsa Belinskogo, 8, kv. 4; Jury Vladimirovich Chernykh, ulitsa Chernyakhovskogo, 13, kv. 17, all of Odessa, U.S.S.R.

[22] Filed: Aug. 6, 1975

[21] Appl. No.: 602,441

[52] U.S. Cl. .................................. 138/43; 137/468
[51] Int. Cl.² .......................................... F15D 7/10
[58] Field of Search ............ 138/43; 137/468, 510; 277/45, 46

[56] References Cited
UNITED STATES PATENTS

| 1,926,413 | 9/1933 | Tibbs .................................... 138/46 |
| 3,340,899 | 9/1967 | Welty et al. ......................... 137/468 |
| 3,521,662 | 7/1970 | Bache ................................. 137/468 |
| 3,552,444 | 1/1971 | Levesque ............................. 138/46 |

*Primary Examiner*—Robert I. Smith
*Attorney, Agent, or Firm*—Lackenbach, Lilling & Siegel

[57] ABSTRACT

A throttle for use in hydraulic drives requiring low flow rate of liquid includes a stationary housing and a rotor located in said housing. In the housing on the side facing the rotor, provision is made for an insert which is mounted with a clearance with respect to the rotor and the clearance serves as a passage for liquid to pass.

The insert is made of the material whose linear expansion factor is larger than that of the material the housing is made of.

The insert changes its linear dimensions against the liquid temperature variation, the liquid flow rate remains uniformly constant or invariable with the liquid temperature change.

18 Claims, 7 Drawing Figures

THROTTLE

The present invention relates to hydraulic apparatus used for control of liquid flow rate in hydraulic systems and, more specifically, to throttles which find most utility when used in the hydraulic drives requiring low liquid flow rates.

At the present time, the most difficult problem to be solved in metal-cutting machines, in precision machines and mechanisms, as well as in hydraulically-driven servo-systems is the fine control (within decimal fractions of cm³/min), since all the prior known throttles ensure a minimum liquid flow rate as high as 10 to 15 cm³/min.

As it is commonly known, the provision of stable low liquid flow rates through the throttle is hampered or difficult to achieve because of two factors:

(a) deterioration (obliteration) of holes or slits having a small cross-sectional area;

(b) variation in viscosity of pressure liquid with heating.

The obliteration or clogging of holes may be eliminated by mechanically controlling the liquid passing through the hole. The known constructional arrangements based on the above-discussed concepts suffer from being too complicated and not reliable in operation (cf., e.g., the monograph by T. M. Bashta, entitled "Engineering Hydraulics", Moscow, 1971).

Known also are the throttles which ensure low liquid flow rates on account of liquid flow through the passage defined by the rotor and the housing.

The flow rate control and elimination of the clogging or obliteration of passages in some of said throttles are attained by resorting to the controllable and reversible rotation of the rotor and selection of a definite passage depth.

However, in each of said throttles a turbulent flow of passing liquid may appear during the rise of the speed of mutual displacement of the walls defining the throttle passage. This is accounted for by the fact that the passage depth is selected without regard for the influence of the passage wall relative speed on the possibility of the turbulent flow to appear therein.

Appearance of the turbulent flow in the throttles having a low flow rate is inadmissible or intolerable as in such a case the liquid flow can be reduced or even discontinued, thus resulting in an unsteady flow rate with time.

Another disadvantage inherent in said throttle resides in the failure to ensure the stable flow rate of liquid due to variation in the liquid viscosity against the liquid temperature change during operation of the hydraulic drive.

The engineering practice of the hydraulic drive is known to employ the elements and material, having high linear expansion factor, in controlling the flow rate of liquid when the latter passes through the throttle.

The variation in the throttle passage cross-sectional area is normally achieved by changing the dimensions of the "throttling body" made of a material having high linear expansion factor, this being achieved by imparting heat to said body or removing it therefrom with the help of a special heat carrier.

However, said throttle is not intended for stabilizing the pressure liquid flow rate with the liquid temperature change, due to a high time lag of the system and the necessity to provide a special feedback device responsive to the temperature of the pressure liquid.

Besides, the throttle construction does not provide the means which prevent the throttle working passage from being clogged or obliterated, thus failing to ensure the control of low liquid flow rates.

It is an object of the present invention to provide such a throttle that would ensure the automatic stabilizing of the liquid flow rate against the temperature variation of said liquid and provide the laminar flow of said liquid at a minimum flow rate of the latter.

This and other objects are achieved by a throttle comprising a stationary housing, a rotor located in said housing and a passage for liquid to pass, said passage being in communication with inlet and outlet holes of the housing. A slot is provided in the housing on the side facing the rotor, and said slot accommodates an insert made of a material whose linear expansion factor is larger than that of the material the housing is made of. Clearance is provided between said insert and the rotor, and said clearance serving as said passage for liquid to pass, the depth of which is selected from the following relation:

$$h \leq \sqrt[3]{\frac{6000\,\mu^2 L}{\rho \cdot p}},$$

where:

$\mu$ — liquid dynamic viscosity factor;
$L$ — passage length;
$\rho$ — mass density of liquid;
$p$ — pressure drop on the throttle;
$h$ — passage depth or amount of clearance.

The fact the insert is made of the material having high linear expansion factor ensures the corresponding change in the passage depth against the temperature variation of liquid flowing through the passage, by varying the height (linear dimension) of the insert.

As it has been established hereinbefore, the passage depth (the amount of the clearance between the insert and the rotor) selected in accordance with said relation provides the width range in controlling the flow rate of the liquid passing through said throttle and ensures the laminar flow of the liquid at its minimum flow rate measured by decimal fractions of cm³/min.

According to the invention, the insert has the height found from the following relation:

$$S = \frac{\sqrt[3]{a\left(\frac{t}{t_o}\right)^k - 1}}{(\alpha_{ins} - \alpha_{hous})(t - t_o)} \cdot h,$$

where:

$S$ — insert height;
$a$ — factor depending on the relation between the working passage dimensions and is adopted to lie within 0.2 to 1;
$t_o$ — minimum temperature of pressure liquid;
$t$ — maximum temperature of pressure liquid;
$h$ — passage depth at temperature $t_o$;
$k$ — liquid viscosity degree index depending on the grade liquid;
$\alpha_{ins}$ — insert material linear expansion factor;
$\alpha_{hous}$ — housing material linear expansion factor.

Selection of the insert height by means of said relation ensures the maximum possible compensation for variations in the liquid flow rate through the throttle when the liquid viscosity changes against the liquid temperature.

Besides, said relation takes into account the initial depth of the passage for liquid to pass.

In compliance with the invention, in the housing on the side facing the rotor, provision is made for a plurality of slots each of them accommodates the insert to form along with the rotor a plurality of passages for liquid to pass, said passages being in communication with the respective inlet and outlet holes in the housing.

Such an embodiment of the throttle makes it possible to increase the number of passages for liquid to pass. Because of this, the total length of the throttle passage can be increased by consecutively intercommunicating said passages.

The increased length of the passage makes it possible to extend the range of the liquid flow rate through the throttle. Connecting said passages in parallel will increase the total flow rate of liquid through the throttle. Besides, each passage for liquid to pass can be used as an independent control of the flow rate.

The present invention is characterized in that the insert is essentially an annular open element, the housing body being located between the ends of said element and conjugated with the surface of the rotor.

Such a constructional arrangement of the insert and the housing makes it possible to isolate the inlet and outlet holes, thus preventing the liquid from by-passing the passage.

In accordance with the invention, the passage for liquid to pass can be defined between the side surface of the insert and the side surface of the rotor, or between the end of the insert and the end of the rotor provided the rotor is diskshaped.

With such embodiments of the passages in the throttle, provision is made for conditions to stabilize the liquid flow rate with the throttle overall dimensions remain uniformly constant or invariable, said conditions make it possible to ensure a further improvement of the throttle construction.

In what follows, the present invention is characterized in that the insert is located at both ends of the rotor to form a plurality of passages on both rotor sides. This permits the pressure exerted on the rotor to be balanced on both sides of said rotor, which in turn makes it possible to exclude the means required for the axial balance of said rotor, with a total number of passages being increased.

The present invention is also characterized in that the rotor is provided with the reversible drive of rotary motion. This makes it possible to prevent the deterioration of the passage for liquid to pass as a result of its obliteration or clogging and to extend the range in controlling the liquid flow rate as rotation of the rotor in the direction coinciding with that of the liquid flow will result in the maximum flow rate of said liquid, and vice versa, when the rotor runs at a definite (preset) speed opposite to the direction of the liquid flow, the liquid flow rate will be equal to zero.

The present invention is also characterized in that the insert has an annular-like boring communicating with the inlet hole in the housing and the passage for liquid to pass. Due to said boring, the liquid is in contact with the body of the insert, thus improving heat exchange between said liquid and the insert and accelerating the liquid flow rate stabilizing process in response to the liquid temperature variation.

In accordance with the present invention, the housing is provided with extra holes consecutively intercommunicating with the annular-like borings of all the inserts.

Provision of the extra holes in the housing makes it possible to consecutively intercommunicate all the throttle passages due to the use of plugs fitted into said holes, with the result that owing to the increased length of the passage, conditions are provided to extend the control range of the flow rate.

Besides, this makes it possible to considerably decrease the liquid flow deviation from the present one as compared with the prior known throttles.

Thus, the throttle of the present invention ensures a stable minimum flow rate of, say, conventional mineral oils, said flow rate being equal to the decimal fractions of $cm^3/min$, without obliteration or clogging of the throttle passage, which makes it possible to use said throttle in most diverse fields of industry, e.g., in precision equipment, in hydraulic servo systems and in program-controlled machines. Besides, the throttle can be used in hydraulic systems having high flow rates of liquid.

The nature of the present invention will be more clearly understood by reference to the accompanying drawings, wherein.

The throttle comprises a stationary housing 1 (FIGS. 1 and 2), a rotor 2 located in said housing and a passage A for liquid to pass.

Figure 3:
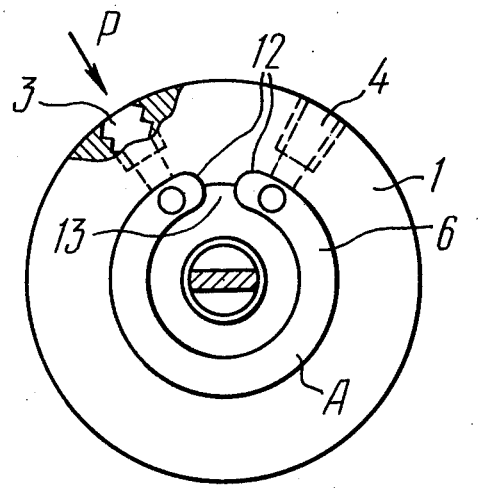
FIG. 3 is a sectional view taken along the line III—III in FIG. 2.

The housing 1 (FIG. 3) is provided with an inlet hole 3 and an outlet hole 4 both communicating with the passage A for liquid to pass and with the hydraulic line (not shown in FIG. 3).

In the housing 1 (FIG. 1) on the side facing the rotor 2, provision is made for a slot 5 accommodating an insert 6 which is essentially an annular open element, said insert being made of a material whose linear expansion factor is larger than that of the material the housing is made of. Used as a material for the insert 6 are capron, fluorine-foamed plastic (Ftoroplast plastic manufactured by the enterprises of the USSR Ministry of Chemical Industry and identified by said mark) and quick-curing plastics. A clearance 7, serving as said passage A for liquid to pass, is located between the rotor 2 and the insert 6. The amount of the clearance 7 or the depth $h$ of said passage A is found from the following relation:

$$h \leq \sqrt{\frac{6000\mu^2 L}{\rho \cdot p}},$$

where:
- $\mu$ — liquid dynamic viscosity factor;
- $L$ — passage length;
- $\pi$ — mass density of liquid;
- $p$ — pressure drop on the throttle;
- $h$ — passage depth or amount of clearance.

The depth of the passage 5 or the height of the insert 6 is selected from the following relation:

$$S = \frac{\sqrt[3]{a\left(\frac{t}{t_o}\right)^k - 1}}{(\alpha_{ins} - \alpha_{hous})(t - t_o)} \cdot h,$$

where:
- $S$ — insert height or passage liquid;
- $a$ — factor depending on the relation between the working passage dimensions and adopted to lie within 0.2 to 1;
- $t_o$ — minimum temperature of liquid;
- $t$ — maximum temperature of liquid;
- $h$ — passage depth at temperature $t_o$;
- $k$ — liquid viscosity index depending on the grade of liquid;
- $\alpha_{ins}$ — linear expansion factor of material the insert is made of;
- $\alpha_{hous}$ — linear expansion factor of material the housing is made of.

Thus, the relation adopted to determine the depth of the passage A takes into account the influence of liquid flow rate with a view to maintaining the liquid laminar flow. The width A along the axis O of the rotor 2 is selected proceeding from the nominal flow rate of liquid and is in a linear dependence therewith.

The relation adopted to determine the height S of the insert 6 takes into account the variation of the pressure liquid viscosity during the liquid heating, as well as the initial depth of the passage A found from the above-indicated relation for the depth $h$.

The sealing of the passage A over the end surfaces of the rotor 2 and the housing 1 is provided by any known means (not shown in the figure). The insert 6 is held in the slot 5 by press-fitting one of the insert ends into a depression provided in the slot 5 as shown in FIG. 2.

Figure 1:
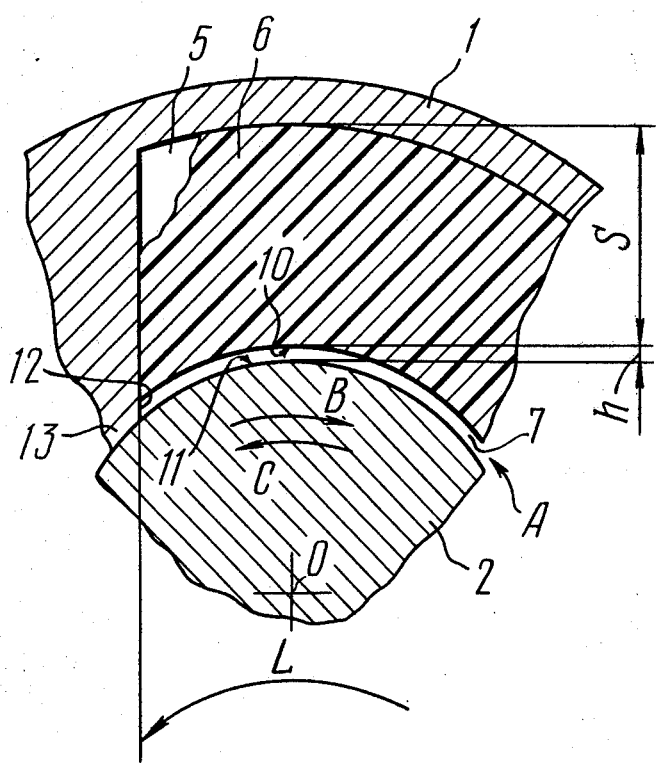
FIG. 1 is a schematic fragmentary cross-sectional view of the throttle, according to the invention.
Figure 2:
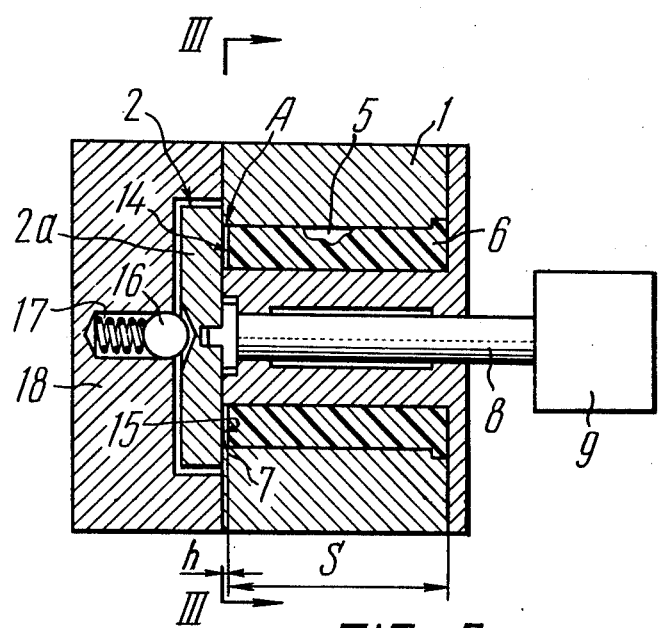
FIG. 2 is a longitudinal-section view of another embodiment of the throttle, according to the invention.
Figure 4:
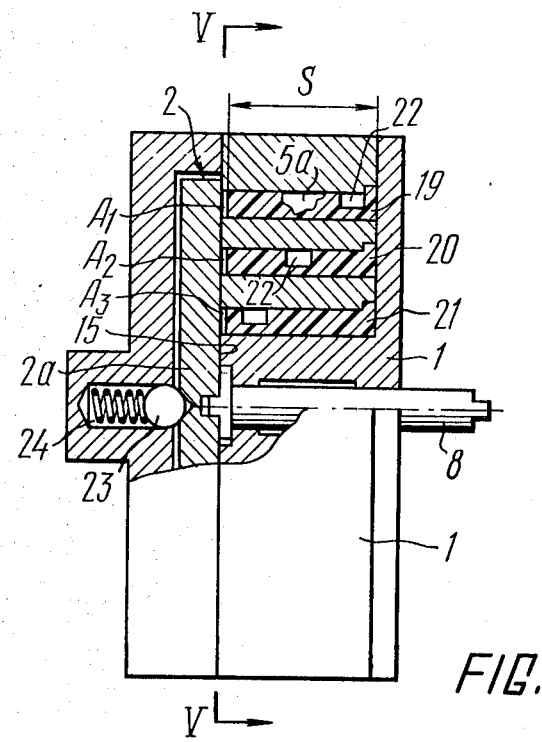
FIG. 4 is an elevational view, partly in section of the throttle according to the invention, illustrating a plurality of inserts.
Figure 6:
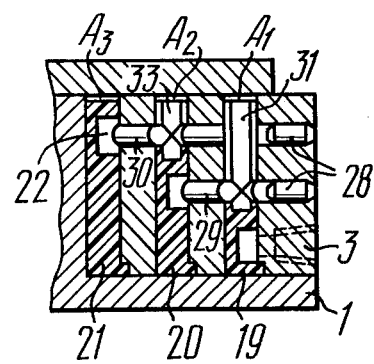
FIG. 6 is a sectional view taken along the line VI—VI in FIG. 5.

The rotor 2 may be made in the form of a cylinder (FIG. 1) or in the form of a flat disk 2a as shown in FIG. 2. The said rotor is in communication with a shaft 8 provided with suitable keyway means at its connecting end to the rotor, as best shown in FIGS. 2, 4 and 6, of any known reversible drive, e.g., with a hydraulic motor or an electric motor or an electric motor with means capable of imparting reversible rotation to the rotor 2.

The clearance 7 (FIG. 1) between the insert 6 and the rotor 2 define the throttle passage A is formed by the side surface 10 of the insert 6 and the side surface 11 of the rotor 2. The insert 6 is suitably a C-shaped or an arcuate annular open element and embraces the rotor substantially over the entire perimeter, and the body of the housing 1 being located between the ends 12 of the insert 6 and joined or conjugated with the surface of the rotor 2. The body of the housing 1 serves as a web 13 which is a tight (clearance-free) fit with the rotor 2 and prevents the liquid from escaping from the inlet hole 3 (FIG. 3) into the outlet hole 4 by-passing the passage A. Any other body can also be used as the web 13.

The clearance 7 (FIG. 2) provided between the insert 6 and the disk 2a (the rotor 2) to define the passage A can be made between an end 14 of the insert 6 and an end 15 of the disk 2a. In this case the slot 5 in the housing 1 and the insert 6 are located square to the end 15 of disk 2a. The body of the housing 1 serves as the web 13 similar to that illustrated in FIG. 1.

The sealing of the passage A (FIG. 2) is provided by means of a spring-loaded ball 16 located in a slot 17 in a cover 18 of the housing 1, or by any other known means.

The throttle of the present invention functions as follows.

From the hydraulic line the throttling liquid under pressure P is fed through the hole 3 (FIG. 3) into the passage A.

The liquid flow rate in said passage A is controlled by varying the speed and the sense of rotation of the rotor 2 (FIGS. 1 and 2), said rotation being shown by the arrows B and C in FIG. 1. If the rotor runs in the liquid-flow direction, the liquid flow rate at the outlet will be higher than that when said rotor runs in the direction opposite to the liquid flow.

When the rotor 2 runs at a definite speed and its sense of rotation is opposite to the liquid flow, the liquid fails to pass through the throttle and the flow rate will be equal to zero.

Any variation in the liquid temperature will change the linear dimension of the insert 6, e.g., when heating the insert to some extent, the height S of said insert will be increased in accordance with the relation mentioned hereinabove, while the initial depth $h$ of the passage A will be decreased to some extent in accordance with said relation. The possible increase of the liquid flow rate, caused by a reduction of the liquid viscosity, will be compensated for by decreasing said flow rate due to the reduction of the passage depth and, thus, the total flow rate of liquid will be at the initial level. With the liquid cooled down, the reverse phenomenon takes place. Thus, the throttle ensures an automatic control over the stability of the rate of liquid flow through the passage A against the liquid temperature variation.

Inasmuch as the walls of the passage A are defined by the surface of the running rotor and the stationary surfaces 10 (FIG. 1) and 14 (FIG. 2) of the insert, the clogging or obliteration of the passage is completely precluded.

With a view to extending the throttle operation capabilities, e.g., the possibility of controlling the operation of several units at a time, or to carry out the various embodiments of the passage intercommunications to vary the degree of the liquid flow rate control, provision is made for a plurality of slots 5a, e.g., for three slots similar to slots 5, in the housing 1 (FIGS. 4 and 5) of the throttle on the side facing the end 15 of the disk 2a. Each of said slots 5a accommodates an insert similar to the insert 6, i.e. inserts 19, 20 and 21 are located therein. Inasmuch as each of said inserts 19, 20 and 21 are mounted with respect to the end 15 of the disk 2a with a clearance, three respective passages $A_1$, $A_2$ and $A_3$ are defined, the depth $h$ of said passages and the height S of the inserts 19, 20 and 21 are being selected from the relations mentioned above. Each of the inserts 6 (FIG. 2) or the inserts 19, 20 and 21 (FIG. 4) is provided with an annular boring 22 which improves the transfer of heat from the running liquid to the material of the insert.

Figure 5:
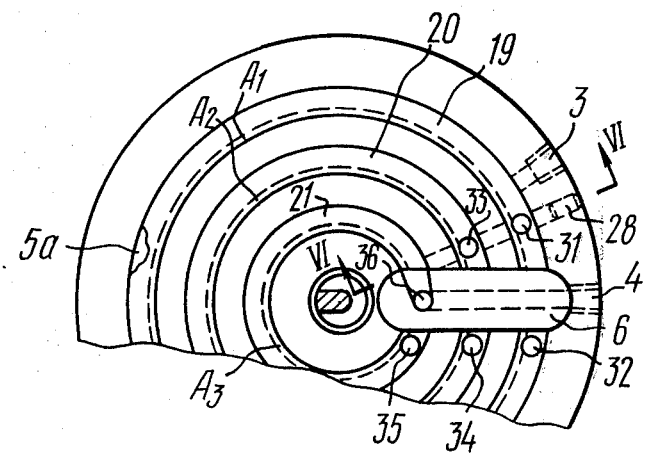
FIG. 5 is a sectional view taken along the line V—V in FIG. 4.

Each of the passages $A_1$, $A_2$ and $A_3$ is in communication with the respective inlet and outlet holes, so that the number of passages corresponds to the quantity of the inserts, and said passages are not shown in FIGS. 4 through 6 for the sake of clarity of the drawings.

Such a constructional feature of the throttle makes it possible to independently connect each of the $A_1$, $A_2$ and $A_3$ passages to the hydraulic line.

The sealing of said passages $A_1$, $A_2$ and $A_3$ and the balancing of the rotor 2 are achieved by means of a springloaded ball 23 located in a slot 24 in the cover of the housing 1.

Figure 7:
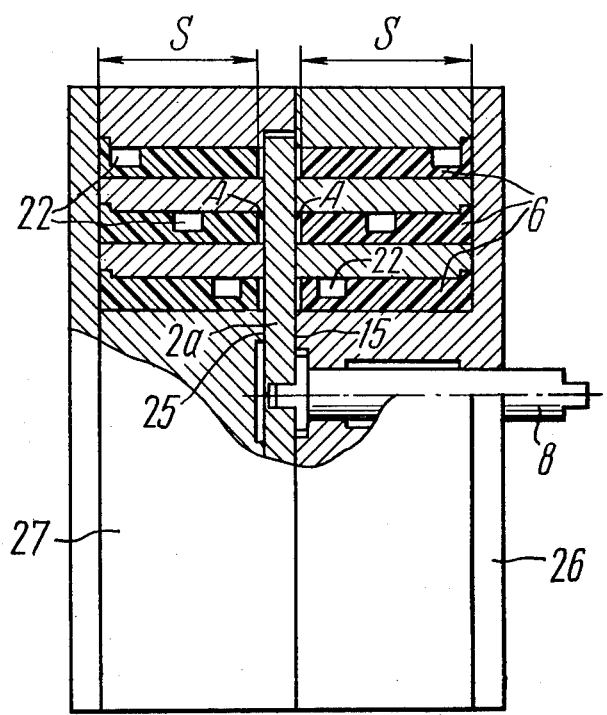
FIG. 7 is an elevational view, partly in section of still another embodiment of the throttle according to the invention, showing inserts located on both sides of the rotor.

However, the sealing of the passages $A_1$, $A_2$ and $A_3$ and the balancing of the rotor 2 can be attained in any other way, e.g., by locating the inserts 6 at both ends of the rotor, i.e., on the side of the ends 25 and 15 of the disk 2a as shown in FIG. 7.

Such an arrangement of the inserts 6 provides a plurality of passages A on both sides of the rotor, each of said inserts 6 having an annular-like boring 22. Each of the passages can be independently connected to the hydraulic system. In this case the housing is made of two halves 26 and 27 embracing the rotor 2 at its both ends 15 and 25. Each of the halves has the slots similar to the slots 5a wherein the inserts 6 are located.

Operation of the throttles shown in FIGS. 4 and 7 and the automatic control of the depth $h$ in the passages for liquid to pass against the liquid temperature variation are accomplished in the aforesaid manner as noted herein with regard to FIGS. 1-3.

The passages $A_1$, $A_2$ and $A_3$ (FIG. 4) of the throttle or the passages A (FIG. 7) can be consecutively interconnected to the hydraulic line, thus increasing the total length of the passage for liquid to pass and thereby extending the control range of the liquid flow rate. For this purpose, one inlet hole 3 and one outlet hole 4 are left open in the housing 1 (FIGS. 5 and 6), while the remaining inlet and outlet holes in said housing are blanked with plugs 28.

To provide the successive flow of liquid from one passage to another, say, from the passage $A_1$ (FIG. 4) into the passage $A_3$, the housing 1 has extra holes 29 and 30 consecutively intercommunicating with the borings 22 (FIG. 5) of the inserts 19, 20 and 21 through the respective holes 31 and 32, 33 and 34, 35 and 36 provided in said inserts.

With such a constructional arrangement of the throttle, the liquid flows over the throttle passages $A_1$, $A_2$, and $A_3$ along the path described below. From the hydraulic line the liquid is fed to the annular boring 22 in the insert 19 through the inlet hole 3 (FIG. 6) and, further on, said liquid flows into the passage $A_1$ through the hole 32 (FIGS. 5). On passing over the passage $A_1$, the liquid flows through the holes 31 in the insert 19 and through the hole 29 (FIG. 6) and flows into the passage $A_2$ via hole 34, and then, passing through the holes 33 and 30 (FIG. 6) provided in the housing, the liquid flows into the annular boring 22 in the insert 21. Through the hole 35 (FIG. 5) in the insert 21 the liquid is fed into the passage $A_3$, wherefrom through the hole 36 it is directed to the outlet hole 4. The automatic control of the depth $h$ in the passages $A_1$, $A_2$ and $A_3$ against the temperature variation of the liquid flowing through said passages is achieved in compliance with the aforesaid relations in a way mentioned above.

What is claimed is:

1. A throttle for use in hydraulic apparatus adapted to control or stabilize the liquid flow rate through the throttle in response to liquid temperature variation and to provide for laminar flow of said liquid comprising: a housing having slot means and including a rotor mounted about the axis of said housing, and being adapted to rotate about same; at least one insert having a height, fixedly secured to said slot means in said housing, and being in juxtaposition with said rotor along at least a portion of a wall face; a throttle passage having a predetermined depth for liquid to pass formed between said insert and said rotor; an inlet hole and an outlet hole in said housing communicating with said throttle passage, and said insert being made of a material having an expansion factor higher than that of said housing; whereby any liquid temperature variation will change the dimensions of the insert thereby affecting said throttle passage so as to adjust and control the flow rate of said liquid flowing through said throttle passage and minimize any clogging thereof.

2. The throttle according to claim 1, wherein the depth of said throttle passage is determined from the following relation:

$$h \leq \sqrt[3]{\frac{6000 \mu^2 L}{\rho \cdot p}},$$

where:
 $\mu$ — liquid dynamic viscosity factor;
 $L$ — passage length;
 $\rho$ — mass density of liquid
 $p$ — pressure drop on the throttle;
 $h$ — passage depth or amount of clearance.

3. The throttle according to claim 1, wherein the height of said insert is determined from the following relation:

$$S = \frac{\sqrt[3]{a\left(\frac{t}{t_o}\right)^k - 1}}{(\alpha_{ins} - \alpha_{hous})(t - t_o)} \cdot h,$$

where:
 $S$ — insert height;
 $a$ — factor depending on the relation between the passage dimensions and adopted to lie within 0.2 to 1;
 $t_o$ — minimum temperature of liquid;
 $t$ — maximum temperature of liquid;
 $h$ — passage depth at temperature $t_o$;
 $k$ — liquid viscosity index depending on the grade of liquid;
 $\alpha_{ins}$ — linear expansion factor of material the insert is made of;
 $\alpha_{hous}$ — linear expansion factor of material the housing is made of.

4. The throttle according to claim 1 wherein said at least a portion of said wall face comprises a side wall face of said rotor.

5. The throttle according to claim 4, wherein said insert is disposed generally perpendicularly to said rotor and said throttle passage is formed between said side wall face of said rotor and the end of said insert facing said rotor.

6. The throttle according to claim 5, wherein said rotor is in the form of a disk.

7. The throttle according to claim 5, wherein a plurality of slot means are provided in said housing; and an insert fixedly secured in each of said slot means, and forming additional throttle passages adapted to be connected to a hydraulic line.

8. The throttle according to claim 7, wherein said additional throttle passages are connected to respective inlet and outlet holes provided in said housing.

9. The throttle according to claim 8, wherein said additional throttle passages are independent of each other so as to form a parallel arrangement with independent control of the liquid flow rate through each of said throttle passages.

10. The throttle according to claim 8, wherein said additional passages are consecutively interconnected so as to form a series arrangement for increasing the total length of the throttle passage and extending the control range of the liquid flow rate.

11. The throttle according to claim 10, wherein each of said inserts is provided with a generally annular-like boring which aids in improving the transfer of heat flow from said liquid to the material of said insert, and a further bore communicating with said boring and the respective throttle passage formed by said insert.

12. The throttle according to claim 11, including additional passageways in said inserts and housing extending from their respective throttle passages to the boring of the next adjacent insert, and all of said inlet and outlet holes, except one of each being blanked with plug means for forming said consecutively interconnected series arrangement.

13. The throttle according to claim 11, wherein said inserts are generally of a C-shape.

14. The throttle according to claim 11, wherein said insert is made of a material having a linear expansion factor higher than that of said housing.

15. The throttle according to claim 8, wherein said plurality of slot means are provided on both side wall faces of said rotor, whereby throttle passages are provided on both sides of said rotor between said rotor and said housing, and said housing is made of two halves which embrace said rotor at both side wall faces.

16. The throttle according to claim 1, wherein said rotor is provided with a rotary-motion reversible drive.

17. The throttle according to claim 1, wherein the rotor is in the form of a cylinder.

18. The throttle according to claim 1 wherein said at least a portion of said wall face comprises a circumferential surface portion of said rotor.

* * * * *